March 19, 1957 E. DYKE 2,786,133

DIVERSITY RECEIVING SYSTEM

Filed March 5, 1953 4 Sheets-Sheet 1

INVENTOR.
Edwin Dyke
BY
Norman L. Mueller
Atty.

March 19, 1957 E. DYKE 2,786,133

DIVERSITY RECEIVING SYSTEM

Filed March 5, 1953 4 Sheets-Sheet 2

Inventor.
Edwin Dyke.
By. Foorman L. Mueller
Atty

Inventor.
Edwin Dyke
By: Norman L. Mueller
Atty.

March 19, 1957 E. DYKE 2,786,133

DIVERSITY RECEIVING SYSTEM

Filed March 5, 1953 4 Sheets-Sheet 4

Inventor
Edwin Dyke
By Foorman L. Mueller
Atty.

United States Patent Office 2,786,133

Patented Mar. 19, 1957

2,786,133

DIVERSITY RECEIVING SYSTEM

Edwin Dyke, Brookfield, Ill., assignor to Motorola, Inc., Chicago, Ill., a corporation of Illinois Application March 5, 1953, Serial No. 340,573

12 Claims. (Cl. 250—20)

This invention relates generally to diversity receiving systems and more particularly to automatic phase shift controlling means for diversity receiving systems. The phase shift controlling apparatus disclosed may be used in the diversity receiving system disclosed in application of Edwin Dyke and Henry Magnuski, Serial No. 340,572 filed March 5, 1953, entitled "Radio System," which application is assigned to the same assignee as the instant application.

It is well known that in radio transmission, waves transmitted from one station to another may be transmitted over a plurality of paths and the various waves may by the transmission be so shifted in phase with respect to each other that the waves at the receiving means may cancel each other to produce what is normally called fading of the signal. The various paths over which the signals are transmitted may be of various different types.

As an example, for microwave use, line of site is required so that there is always one direct path. There may be other paths caused by reflection of the waves from the land, water, or man-made structures. There may also be bending of the paths by the atmosphere so that paths which are not actually reflected will be bent to have different lengths from each other which may produce cancellation at the receiving antenna to thereby cause fading. It will be obvious that such conditions vary with time because of the changing atmospheric conditions and, although some predictions may be made, it is not possible to accurately determine what these changes will be.

To compensate for fading due to multipath propagation, it has been proposed to space receivers and provide a system for using one or the other of a plurality of receivers which produces the best signal at a given moment. It has also been proposed to combine the outputs of a plurality of receivers. However, such systems require complete duplication of equipment and have not been found to provide satisfactory results under all conditions.

It is an object of the present invention to provide an improved automatic diversity receiving system wherein the received signals are combined at radio frequency level.

A further object of this invention is to provide a diversity receiving system in which signals from spaced antennas are combined through adjustable phase shifting means coupled to one antenna, with the phase shifting means being controlled automatically in accordance with the level of the combined received signal.

Another object of this invention is to provide an improved wave guide phase shifter control system which responds to a control signal and provides the required phase shift rapidly with a minimum of hunting.

A feature of this invention is the provision of a diversity receiving system in which signals from two spaced antennas are combined, having automatic phase shift means controlled by the strength of the signal received for changing the phase of the waves from one antenna.

Another feature of this invention is the provision of a microwave receiving system wherein two-spaced antennas are connected to a receiver and/or transmitter through waveguides, with one waveguide having phase shift means therein and means to automatically adjust the position of the phase shift means in accordance with the strength of the received signal.

A further feature of this invention is the provision of an automatic phase shift control unit including a reversible motor for moving a phase controlling member and a control element for starting operation of the motor when the signal level falls below a first point and a second control element for reversing the direction of the motor when the signal level falls further. Limit switch means may be provided for further controlling the motor so that the phase controlling member moves back and forth between desired limits.

Further objects, features and the attending advantages of the invention will be apparent from a consideration of the following description when taken in connection with the accompanying drawings, in which.

In practicing the invention there is provided a diversity receiving system for combining waves transmitted over slightly different paths in such a manner that the combined signal is maximum. This may be accomplished by the use of two separate antennas which are coupled together by waveguides with automatic phase shift means in the waveguide from one antenna for shifting the waves received by this antenna. The adjustment of the phase shift means is accomplished automatically by a control circuit which adjusts the position of a phase shifter in a waveguide in accordance with the level of received waves so that a phase shift is provided to compensate for the phase shifts introduced as by changing atmospheric conditions. In a second embodiment spaced antennas may apply signals to separate mixers with a single local oscillator being provided for the two mixers and the path from the local oscillator to one mixer including the automatic phase shift means for thereby shifting the phase of the output of the mixer so that the outputs from the two mixers when combined provide a maximum signal.

Figures 1, 2, 7:
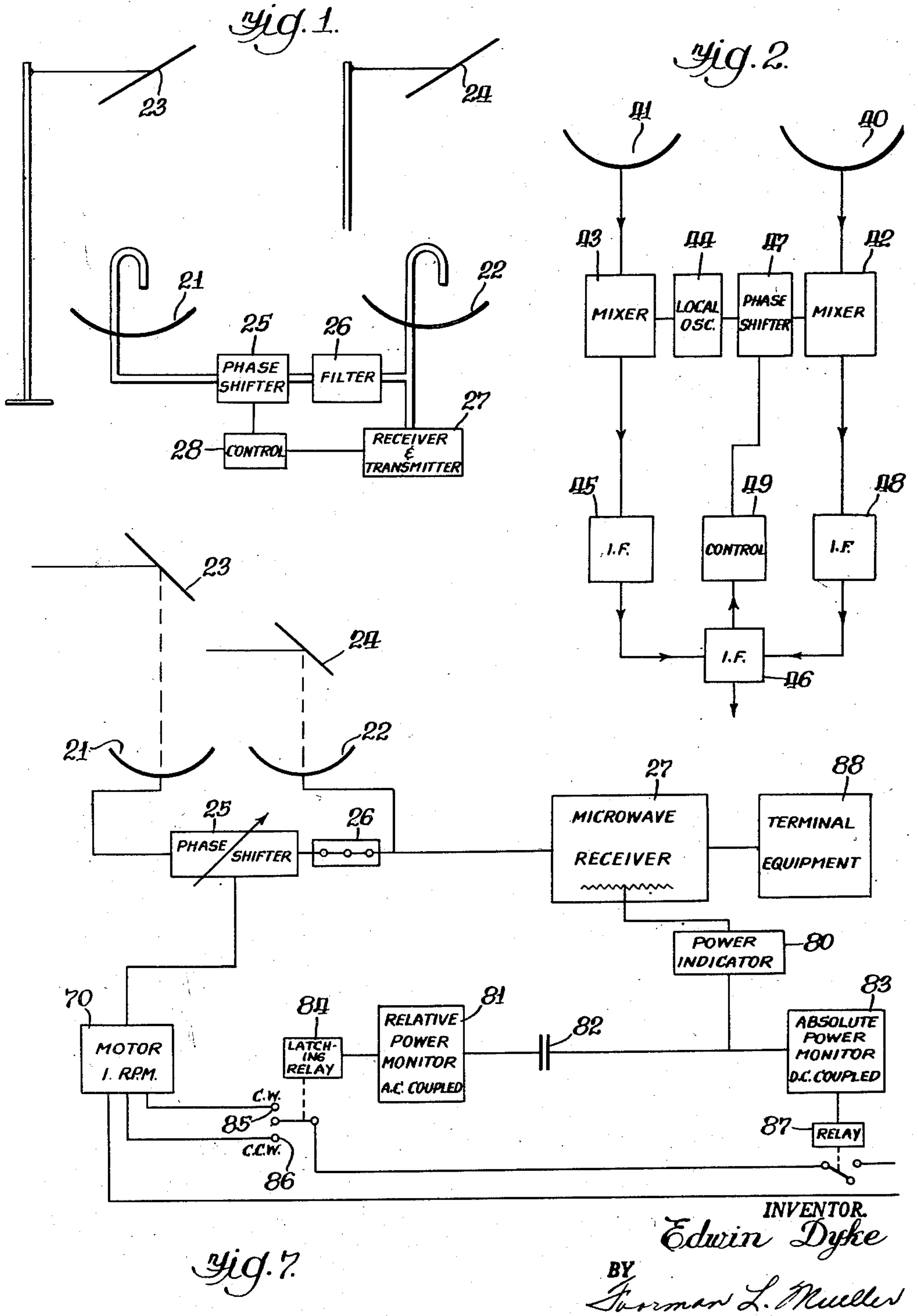
Fig. 1 illustrates schematically the diversity receiving system in accordance with the invention.
Fig. 2 illustrates an embodiment of the diversity receiving system having automatic phase shift control applied to the waves from the local oscillator.
Fig. 7 is a block diagram of the system of Fig. 1 showing the automatic control.

Referring now to the drawings, in Fig. 1 there is illustrated a diversity receiving system in which signals from two antennas are combined and the phase of one is automatically shifted to provide a strong signal. Two separate antennas 21 and 22 are provided which include reflectors 23 and 24 respectively for directing waves thereto and therefrom. The output from antenna 21 is applied through a phase shifter 25 and a filter 26 and then combined with the output of the antenna 22, with the combined output being applied to the receiver 27. The phase shifter 25 may be adjustable so that the wave from the antenna 21 will be controlled to have the proper phase to combine with the wave from the antenna 22 so that the output of the receiver 27 is maximum. This control may be accomplished automatically through a control 28 operating from the output of the receiver and controlling the position of the phase shifter 25. The filter 26 is necessary only when the unit 27 includes both a receiver and a transmitter. The filter 26 may be a tuned cavity resonator which passes the received frequencies, and which presents a high impedance to the transmitted frequencies. Therefore transmission takes place only through the antenna 22, and reception takes place from both antennas 21 and 22.

In Fig. 2 there is shown a second embodiment of the invention wherein waves from two antennas 40 and 41 are applied to separate mixers 42 and 43 respectively. A local oscillator 44 is connected directly to mixer 43 and the output amplified in intermediate frequency amplifier 45 and combined in the intermediate frequency amplifier 46. The oscillations from local oscillator 44 are applied through phase shifter 47 to the mixer 42, with the output of the mixer being applied to the intermediate frequency amplifier 48 and then combined in the intermediate frequency amplifier 46. A control 49 operated by the signal strength in the intermediate frequency amplifier 46 may adjust the phase shifter 47 so that the signals in the two paths have the proper phase relationship to combine in the intermediate frequency amplifier 46 to provide a maximum total signal. The control 49 is therefore generally similar to the control 28 of Fig. 1.

Figure 3:
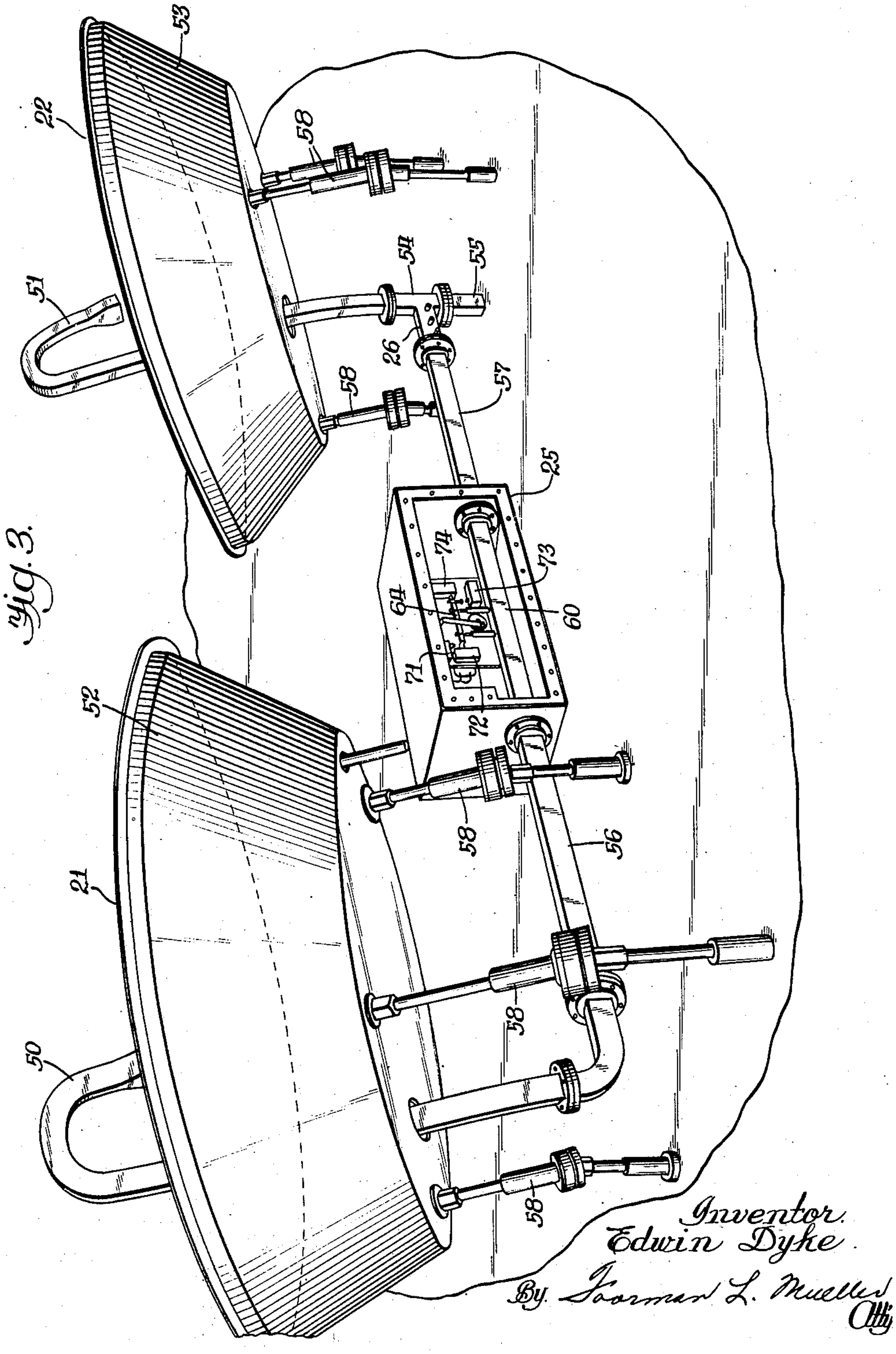
Figs. 3 to 5 illustrate the physical construction of the phase shift means for use in the system of Fig. 1.

Reference is now made to Figs. 3–8 inclusive which illustrate more in detail the construction of a system as illustrated generally in Fig. 1. As shown in Fig. 3, the two antennas 21 and 22 are spaced conveniently with respect to each other and may include reflectors mounted on towers, not shown. The antennas include horns 50 and 51 for transmitting and receiving microwave signals with the signals being first formed into beams by the parabolic reflectors 52 and 53 and then directed by 45° reflectors positioned on masts as illustrated in Fig. 1. The horn 51 is connected through the T-junction or other branching junction 54 to a wave guide 55 which makes connection to the receiver and/or transmitter. The horn 50 is connected through a wave guide 56 to the phase shifter 25, which is in turn connected through wave guide 57 to the T-junction 54. The filter 26 of Fig. 1 may be included in the T-junction 54. As will be apparent the parabolic reflectors 52 and 53 are mounted on adjustable supports 58 so that the beam can be directed precisely in the direction desired.

Figure 4:
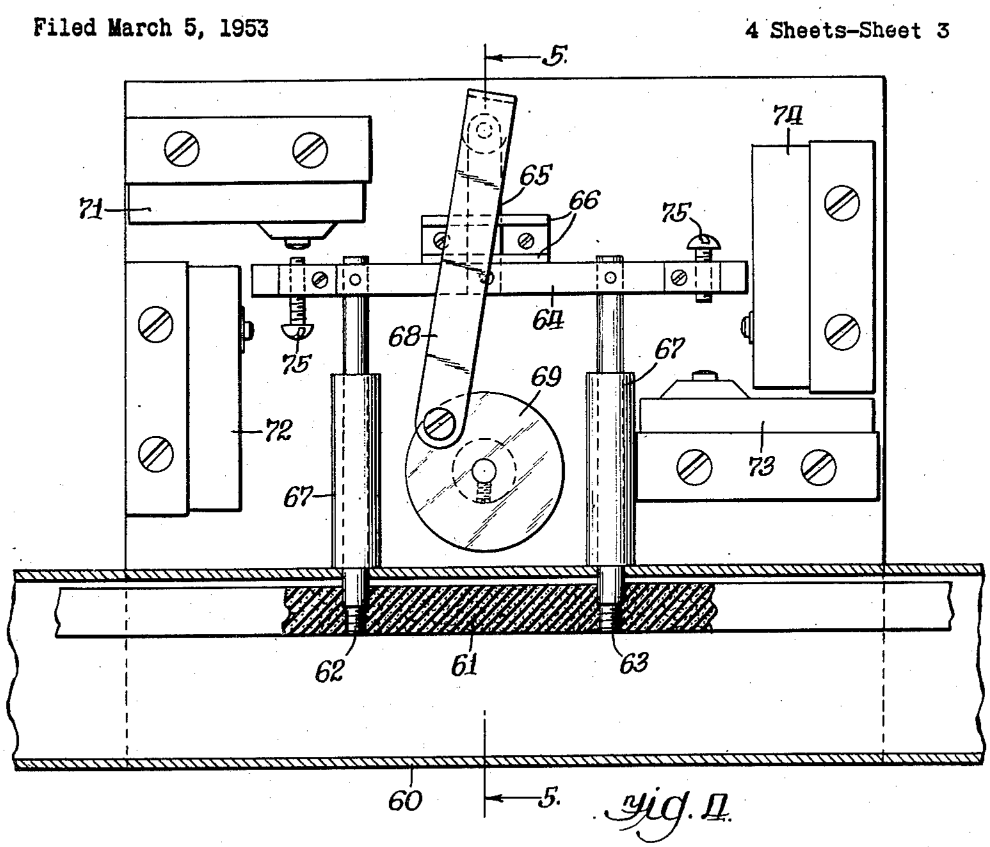
Figures 5, 6:
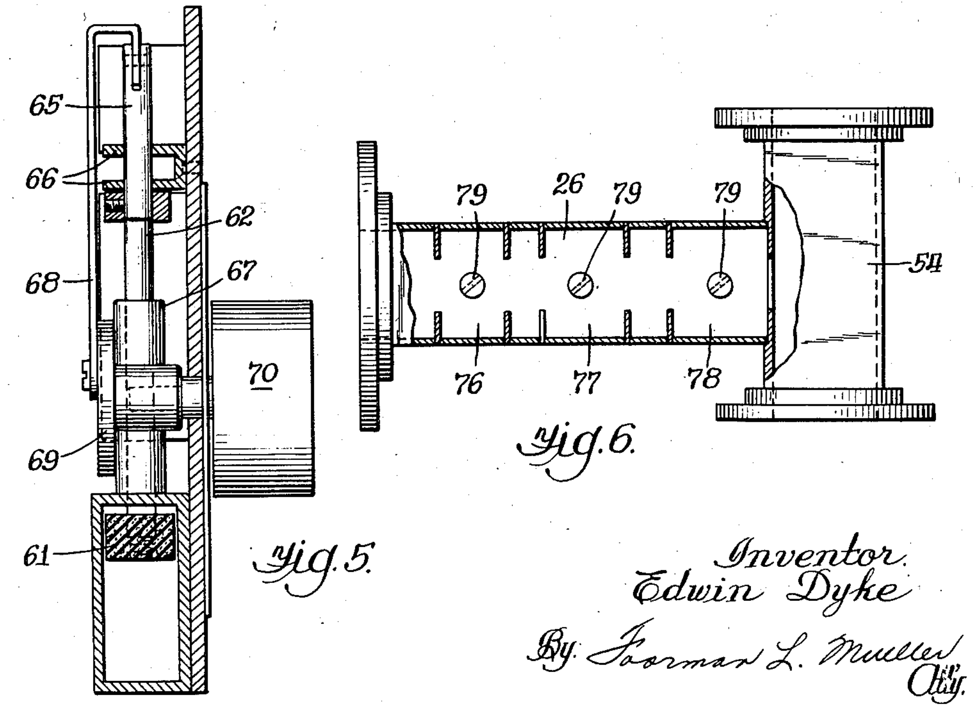
Fig. 6 illustrates the construction of a cavity for isolating the phase shifter.

Figs. 3, 4 and 5 illustrate more particularly the construction of the phase shifter 25. The phase shifter includes a wave guide section 60 in which there is positioned a dielectric member 61. The dielectric member 61 is supported by rods 62 and 63 which are connected to a carriage 64. The rods 62 and 63 slide in guide cylinders 67. The carriage 64 has a drive pin 65 extending at the top thereof which passes through the guides 66. The drive pin 65 is driven by a crank arm 68 connected to the drive wheel 69. The drive wheel 69 is connected to a driving motor 70 as shown in Fig. 5. It is therefore seen that upon rotation of the motor the dielcctric member 61 will be moved cyclically across the wave guide 60 and by stopping the dielectric member in various positions in the wave guide, the phase shift of waves passing through the wave guide 60 may be controlled.

For controlling the movement of the dielectric member four microswitches 71, 72, 73 and 74 are provided which cooperate with relative and absolute control circuits which will be described more in detail. The switches 71 and 73 are limit switches having the operating members thereof engaged by screws 75 threaded in the carriage 64. The switches 72 and 74 are engaged by the ends of the carriage 64 when the carriage approaches the central position in the wave guide.

In Fig. 6 there is illustrated the construction of the cavity filter 26 which is provided in the wave guide T 54. The filter is illustrated as a triple cavity including the sections 76, 77 and 78 each of which has a tuning screw 79 therein for providing precise control of the frequency characteristics thereof. It is obvious that a cavity including more or less than 3 sections may be suitable for use in some instances.

In Fig. 7 there is shown the block diagram of the antenna and control system of Fig. 1. The antennas 21 and 22, phase shifter 25, cavity filter 26, receiver 27 and control equipment 28 are as shown in Fig. 1. The control equipment is shown more in detail in Fig. 7, and includes the power indicator 80 which applies signals to a relative power monitor 81 and to a nabsolute power monitor 83. The relative power monitor 81 is alternating current coupled through condenser 82, and controls relay means 84 which is effective to energize the motor 70 through either contact 85 or contact 86. Energization through contact 85 provides clockwise rotation of the motor and energization through contact 86 provides counterclockwise rotation. The amount of rotation of the motor is controlled through the absolute power monitor 83 by operation of the relay 87.

Figure 8:
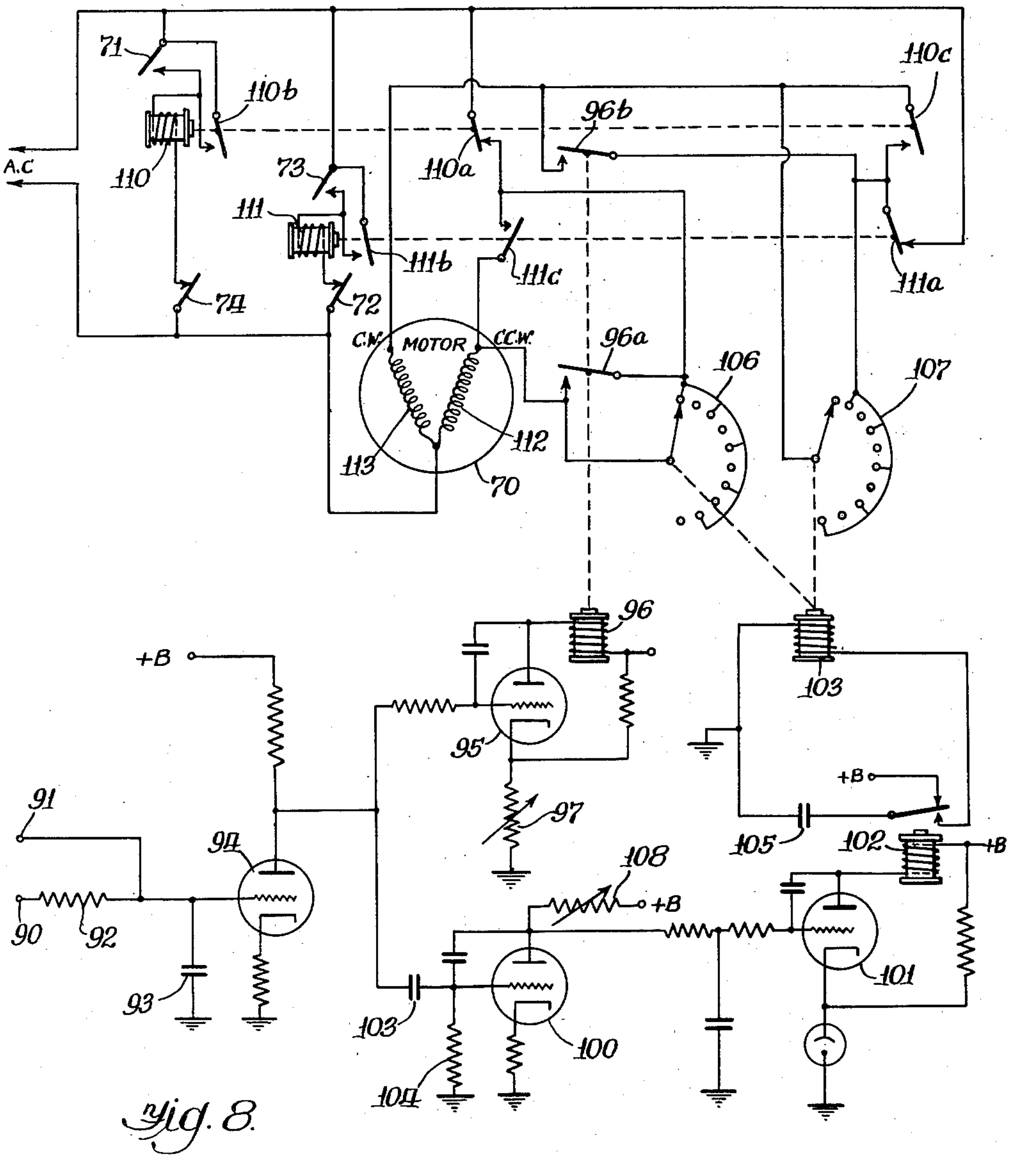
Fig. 8 is the detailed diagram of the control circuit of this system.

One specific circuit which may be used to provide the control is illustrated in Fig. 8. This circuit includes the four microswitches 71, 72, 73, and 74 and the motor 70 as shown in Figs. 4 and 5. Control is provided by voltages from the microwave receiver, the voltage from the grid of the 6th IF stage being applied at terminal 90 and the voltage from the grid of the first limiter stage being applied at terminal 91. These voltages are used because the combined voltage is linear with respect to power. For very weak signals the first limiter grid voltage varies linearly with the input power, and for stronger signals the limiter stage is saturated and the sixth or last IF stage provides a grid voltage which is linear with respect to input power. Therefore, by combining the two voltages a control voltage is provided which is substantially linear with output power over a very wide range.

The voltages from terminals 90 and 91 are combined by resistor 92 and applied across condenser 93 to the grid of the amplifier tube 94. The triode 94 is D. C. coupled to the triode 95 of the absolute control circuit which operates relay 96 connected to the plate thereof. When the received power level drops, the grid of triode 94 becomes less negative providing a decrease in voltage at the grid of triode 95. This will tend to cut off the triode 4 to release the relay 96 to energize the motor 70. The level at which the relay 96 will operate will depend upon the setting of the variable resistor 97 in the cathode circuit of the tube 95. When the level at the receiver increases, the grid of triode 94 will become more negative to increase the voltage at the grid of triode 95 so that this triode will energize relay 96 and cut off the motor. The output of the amplifier 94 is also applied to the relay power control circuit which includes the triodes 100 and 101, relay 102 and stepping switch 103. The amplifier 94 is coupled to the triode 100 through the time constant circuit including condenser 103 and resistor 104. As the received signal drops, the grid of triode 100 becomes more negative and its plate becomes more positive. This positive pulse is coupled to the triode 101 which is normally cut off and causes the triode to conduct to energize the relay 102. Relay 102, when energized connects the condenser 105 to the stepping relay 103 to apply a voltage pulse thereto to cause it to move one position. The condenser 105 charges from +B when the relay 102 is released. It will be noted that the stepping relay 103 includes levels 106 and 107 having the alternate terminals thereof connected together. Accordingly, on alternate operations of the stepping switch, closed circuits are provided through the levels 106 and 107 respectively. This operation is used to provide a reversal of the direction of the motor 70 each time the relative relay circuit is actuated.

The sensitivity of the relative control circuit is controlled by the variable resistor 108 which applies potential to the plate of the triode 100. This control is set so that the relative relay will be operated when the signal level at the receiver drops below the level at which the absolute control circuit is operated. The time constant circuit 103, 104 delays the action of the relative control circuit so that this circuit will not operate until after the absolute control circuit starts so that if the signal level is restored by the absolute control circuit, the relative circuit will not take effect.

As previously stated, the limit microswitches 71, 72, 73 and 74 are connected in the control system with the absolute and relative controls. The microswitches 71 and 74 are connected in a circuit for energizing the relay 110, and the microswitches 72 and 73 are connected in a circuit for energizing the relay 111. The motor 70 includes two windings, the winding 113 which provides clockwise rotation, and the winding 112 which provides counterclockwise rotation. The construction of the motor is such that if both windings are energized the motor will not run, and of course, if neither winding is energized it will not run. The contacts 96*a* and 96*b* which are connected in parallel with the stepping switch levels 106 and 107 respectively and are normally closed to energize both windings 112 and 113 so that the motor 70 remains still.

When the signal level drops so that the absolute relay 96 is released, the contacts 96*a* and 96*b* thereof will open to provide a circuit only to the winding 112 or to the winding 113 depending upon whether a connection is established through level 106 or level 107 of the stepping switch 103. If the absolute circuit operates to release relay 96 when the level 106 provides a closed circuit, as shown in Fig. 8, energy is applied to the winding 112 of the motor 70 through the contacts 110*a* of relay 110, and level 106. The winding 113 is not energized as contacts 96*b*, level 107, and contacts 110*c* are all open. This will cause rotation of the motor in a counterclockwise direction so that the carriage 64 will move upward. In the event that the absolute control circuit causes the carriage to move until the dielectric member 61 approaches the upper wall of the wave guide, the switch 71 will close to energize the relay 110. Energization of the relay 110 will close the holding contact 110*b* thereof, open the contact 110*a*, which provides a circuit to the winding 112 of the motor, and close contact 110*c*. This will provide a circuit for the winding 113 of the motor through the closed contact 111*a* of relay 111 and closed contacts 110*c*. The motor will then rotate in a clockwise direction until the carriage 64 moves to the center position wherein the microswitch 74 will be actuated to break the holding circuit for the relay 110. This will stop the clockwise rotation of the motor since the contact 110*c* will be broken and will cause clockwise rotation as contact 110*a* will again complete the circuit through winding 112.

If, on the other hand, the stepping switch of the relative control circuit is in a position so that contact is established through the level 107, only the winding 113 of the motor will be energized through contacts 111*a*, and level 107 of the stepping switch to cause clockwise rotation of motor 70. In the event the dielectric member 61 is moved all the way to the bottom of the wave guide, the microswitch 73 will be closed, energizing the relay 111, opening the contacts 111*a* thereof and closing the contacts 111*b* and 111*c*. This will deenergize winding 113, and winding 112 will be energized through contacts 110*a* and 111*c*. When the member 61 then moves back to the center of the wave guide the switch 72 will open to release the relay 111 and thereby release the holding contacts 111*b* and the contact 111*c*, and close the contacts 111*a*. This will again energize the motor winding 113 through the contacts 111*a* of relay 110 which is normally closed.

Therefore, at any time the absolute relay is released because of a drop in signal level, the dielectric phase shifter is moved from its position to one side of the wave guide and back to the center thereof unless the signal increases to cut off the motor. If movement of the phase shifter causes the signal level to further decrease, the relative control circuit will operate to cause the stepping relay to change position so that the motor will reverse direction and the phase shifter will move toward the other side of the wave guide. When the phase shifter reaches a position at which the signal level increases to a suitable value, the absolute relay will immediately close to stop the motor. It is to be noted that the absolute control circuit controls the operation of the motor and the limit switches cause a hunting movement of the phase shifter between the center and one side of the wave guide. If the signal level falls further, the relative control circuit will take over to cause the phase shifter to change direction and move toward the other side of the wave guide. It has been found that a motor having a speed of 1 R. P. M. is satisfactory in this system. The time constant of the circuit 103, 104 may be of the order of 1/30 of a second.

It will be obvious that a control circuit such as shown in Fig. 8 could be used in the system shown in Fig. 2 wherein the waves from the local oscillator 44 are shifted before application to the mixer 42. This may be accomplished either by a phase shifter in a waveguide as illustrated in Figs. 4 and 5 or by other suitable phase shifting means.

The system in accordance with the invention operates completely automatically to change the phase of the signal from one antenna so that the combined signals provide an acceptable signal for the receiver. This, therefore, permits the use of this system at an unattended station. The system is relatively simple and has been found to be highly satisfactory in operation. The movement of the phase shifter is at a very slow speed and the operation of the control system is such that the hunting action is reduced to a minimum.

Although certain embodiments of the invention have been disclosed which are illustrative thereof, it is obvious that various changes and modifications can be made therein without departing from the intended scope of the invention as defined in the appended claims.

I claim:

1. A diversity receiving system for microwaves including in combination first and second spaced antenna means, first and second wave guide means respectively connected to said antenna means, receiver means coupled to said first and second wave guide means for combining the waves therein, one of said wave guide means including adjustable phase shift means for shifting the phase of the waves applied thereby to said combining means, and control means responsive to the level of the waves in said receiver means for automatically adjusting said adjustable phase shift means when the level in said receiver means falls below a predetermined value, said control means including a first portion operative when the level in the receiver falls below a first value to change the adjustment of said phase shift means, and a second portion operative when the level in the receiver falls below a second value lower than said first valve to change the direction of the adjustment of said phase shift means.

2. Phase shift apparatus for use at microwave frequencies including in combination, wave guide means, receiver means coupled to said wave guide means, adjustable dielectric means within said wave guide means for shifting the phase of the waves therein, and control means responsive to the level of the waves in said receiver means for automatically adjusting said adjustable dielectric means when the level in said receiver means falls below a predetermined value, said control means including a first portion operative when the level in the receiver falls below a first value to move said dielectric means in one direction, and a second portion operative when the level in the receiver falls below a second valve lower than said first value to move said dielectric means in the opposite direction.

3. Phase shift apparatus for use at microwave frequencies including in combination wave guide means for conducting waves, means coupled to said wave guide means providing a control voltage which varies with the phase of the waves in said wave guide means, an adjustable dielectric member in said wave guide means for shifting the phase of the waves therein, reversible motor means, means connecting said reversible motor means to said dielectric member so that said member is movable transversely across said wave guide in response to rotation of said motor means, absolute control means operative when said control voltage falls below a first value, relative control means operative when said control voltage falls below a second value which is lower than said first value, switch means including first and second portions operative when said dielectric member approaches the sides of said wave guide and third and fourth portions operative when said dielectric member approaches the center of said wave guide, and a control circuit for said reversible motor means including said relative control means, said absolute control means and said switch means, said control circuit causing operation of said motor means in response to operation of said absolute control means with the direction of rotation depending on the position of said relative control means, first and second relay means individually operated by said first and second switch portions and operating to reverse the direction of rotation of said motor means when said dielectric member approaches the sides of said wave guide, said third and fourth switch portions being individually connected to said first and second relay means for releasing the same and again reversing the direction of said motor means when said dielectric member approaches the center of said wave guide, and said control circuit causing said motor means to reverse its direction of rotation in response to operation of said relative control means to cause said dielectric member to move from one side of said wave guide to the other side.

4. A diversity receiving system for microwave including in combination first and second spaced antenna means, first and second wave guide means respectively connected to said antenna means, receiver means coupled to said first and second wave guide means for combining the waves therein, one of said wave guide means including an adjustable dielectric member therein for shifting the phase of the waves applied therethrough to said combining means, reversible motor means, means connecting said reversible motor means to said dielectric member so that said member is movable transversely across said wave guide in response to rotation of said motor means, means coupled to said receiver means for providing a control voltage varying substantially linearly with the level of the wave received thereby, absolute control means operative when said control voltage falls below a first value, relative control means operative when said control voltage falls below a second value which is lower than said first value, switch means including first and second portions operative when said dielectric member approaches the sides of said wave guide and associated portions operative when said dielectric member approaches the center of said wave guide, and a control circuit for said reversible motor means including said relative control means, said absolute control means and said switch means, said control circuit causing operation of said motor means in response to operation of said absolute control means with the direction of rotation depending on the position of said relative control means, said first and second switch portions operating to change the direction of rotation of said motor means when said dielectric member approaches the sides of said wave guide, and said control circuit including means causing said motor means to reverse its direction of rotation in response to operation of said relative control means.

5. A diversity receiving system for microwaves including in combination first and second spaced antenna means, first and second wave guide means respectively connected to said antenna means, receiver means coupled to said first and second wave guide means for combining the waves therein, one of said wave guide means including an adjustable dielectric member therein for shifting the phase of the waves applied therethrough to said combining means, reversible motor means connecting said reversible motor means to said dielectric member so that said member is movable transversely across said wave guide in response to rotation of said motor means, means coupled to said receiver means for providing a control voltage varying substantially linearly with the level of the wave received thereby, absolute control means operative when said control voltage falls below a first value, relative control means operative when said control voltage falls below a second value which is lower than said first value, switch means including first and second portions operative when said dielectric member approaches the sides of said wave guide and an additional portion operative when said dielectric member approaches the center of said wave guide, and a control circuit for said reversible motor means including said relative control means, said absolute control means and said switch means, said control circuit causing operation of said motor means in response to operation of said absolute control means with the direction of rotation depending on the position of said relative control means, said first and second switch portions operating to change the direction of rotation of said motor means when said dielectric member approaches the sides of said wave guide and said additional portion obviating the action of said first and second portions to again reverse the direction of said motor means when said dielectric member approaches the center of said wave guide, and said control circuit causing said motor means to reverse its direction of rotation in response to operation of said relative control means.

6. A diversity receiving system for microwaves including, in combination, first and second spaced antenna means, means connected to said antenna means for combining the waves therefrom and including wave guide means having an adjustable dielectric member therein for shifting the phase of the waves from one of said antenna means, reversible motor means, means connecting said reversible motor means to said dielectric member so that said member is movable transversely across said wave guide in response to rotation of said motor means, means coupled to said receiver means for providing a control voltage varying substantially linearly with the level of the wave received thereby, absolute control means operative when said control voltage falls below a first value, relative control means operative when said control voltage falls below a second value which is lower than said first value, switch means including first and second portions operative when said dielectric member approaches the sides of said wave guide and third and fourth portions operative when said dielectric member approaches the center of said wave guide, and a control circuit for said reversible motor means including said relative control means, said absolute control means and said switch means, said control circuit causing operation of said motor means in response to operation of said absolute control means with the direction of rotation depending on the position of said relative control means, first and second relay means individually operated by said first and second switch portions and operating to reverse the direction of rotation of said motor means when said dielectric member approaches the sides of said wave guide, said third and fourth switch portions being individually connected to said first and second relay means for releasing the same and again reversing the direction of said motor means when said dielectric member approaches the center of said wave guide, and said control circuit causing said motor means to reverse its direction of rotation in response to operation of said relative control means to cause said dielectric member to move from one side of said wave guide to the other side.

7. A diversity receiving system for microwaves including in combination first and second spaced antenna means, means coupled to said first and second antenna means for combining the waves therefrom and including wave guide means having an adjustable dielectric member therein for shifting the phase of the waves from one of said antenna means, reversible motor means, means connecting said reversible motor means to said dielectric member so that said member is movable transversely across said wave guide in response to rotation of said motor means, means coupled to said receiver means for providing a control voltage varying substantially linearly with the level of the wave received thereby, absolute control means for causing operation of said motor means when said control voltage falls below a first value, relative control means for changing the direction of rotation of said motor means when said control voltage falls below a second value which is below said first value, and switch means including portions operative when said dielectric member is adjacent the sides of said wave guide and associated portions operative when said dielectric member is adjacent the center of said wave guide, said switch portions being operative to change the direction of rotation of said motor means so that operation of said absolute control circuit causes reciprocal movement of said dielectric member between one side and the center of said wave guide, said relative control circuit being operative to reverse the direction of rotation of said motor means and cause movement of said dielectric member to the other side of said wave guide, with said member moving between said other side and the center of said wave guide so long as said absolute control circuit causes operation of said motor means.

8. A diversity receiving system for microwaves including in combination first and second spaced antenna means, first and second wave guide means respectively connected to said antenna means, receiver means coupled to said first and second wave guide means for combining the waves therein, one of said wave guide means including an adjustable dielectric member therein for shifting the phase of the waves applied therethrough to said combining means, reversible motor means, means connecting said reversible motor means to said dielectric member so that said member is movable transversely across said wave guide in response to rotation of said motor means, means coupled to said receiver means for providing a control voltage varying substantially linearly with the level of the wave received thereby, absolute control means for causing operation of said motor means when said control voltage falls below a first value, relative control means for changing the direction of rotation of said motor means when said control voltage falls below a second value which is below said first value, and switch means including first and second portions operative when said dielectric member is adjacent the sides of said wave guide and at least one portion operative when said dielectric member is adjacent the center of said wave guide, first and second relay means individually responsive to said first and second switch portions operative to change the direction of rotation of said motor means, said first and second relay means being released by said portion of said switch means operative when said dielectric member approaches the center of said wave guide to thereby provide reciprocal movement of said dielectric member between one side and the center of said wave guide, said relative control circuit being operative to reverse the direction of rotation of said motor means and cause movement of said dielectric member to the other side of said wave guide, with said member moving between said other side and the center of said wave guide.

9. A diversity receiving system including in combination first and second spaced antenna means, means coupled to said first and second antenna means for combining the waves therein, said combining means including an adjustable phase shift member for shifting the phase of the waves received by one of said antenna means, reversible motor means, means connecting said reversible motor means to said member for moving the same in response to rotation of said motor means between two extreme positions which define a range of positions which provide a range of phase shifts, means coupled to said combining means for providing a control voltage varying substantially linearly with the level of the combined waves therein, absolute control means operative when said control voltage falls below a first value, relative control means operative when said control voltage falls below a second value which is lower than said first value, switch means including first and second portions operative when said member approaches said extreme positions and associated portions operative when said member approaches the center of said range of positions, and a control circuit for said reversible motor means including said relative control means, said absolute control means and said switch means, said control circuit causing operation of said motor means in response to operation of said absolute control means with the direction of rotation depending on the position of said relative control means, said first and second switch portions operating to change the direction of rotation of said motor means when said member approaches said extreme positions, and said control circuit including means causing said motor means to reverse its direction of rotation in response to operation of said relative control means.

10. A diversity receiving system including in combination first and second spaced antenna means, means coupled to said first and second antenna means for combining the waves therein, said combining means including an adjustable phase shift member therein for shifting the phase of the waves received by one of said antenna means, reversible motor means, means connecting said reversible motor means to said member for moving the same in response to rotation of said motor means between two extreme positions which define a range of positions which provide a range of phase shifts, means coupled to said combining means for providing a control voltage varying substantially linearly with the level of the combined waves, absolute control means operative when said control voltage falls below a first value, relative control means operative when said control voltage falls below a second value which is lower than said first value, switch means including first and second portions operative when said member approaches the said extreme positions and an additional portion operative when said dielectric member approaches the center of said range of positions, and a control circuit for said reversible motor means including said relative control means, said absolute control means and said switch means, said control circuit causing operation of said motor means in response to operation of said absolute control means with the direction of rotation depending on the position of said relative control means, said first and second switch portions operating to change the direction of rotation of said motor means when said member approaches said extreme positions and said additional portion obviating the action of said first and second portions to again reverse the direction of said motor means when said dielectric member approaches the center of said range of positions, and said control circuit including means causing said motor means to reverse its direction of rotation in response to operation of said relative control means to cause said member to shift from one side of the range of positions to the other side.

11. A diversity receiving system for microwaves including in combination first and second spaced antenna means, means coupled to said first and second antenna means for combining the waves therefrom and including wave guide means having an adjustable dielectric member therein for shifting the phase of the waves from one of said antenna means, reversible motor means, means connecting said reversible motor means to said dielectric member so that said member is movable transversely across said wave guide in response to rotation of said motor means, means coupled to said receiver means for providing a control voltage varying with the level of the wave received thereby, absolute control means for causing operation of said motor means when said control voltage falls below a first value, relative control means for changing the direction of rotation of said motor means when said control voltage falls below a second value which is lower than said first value, and limit means for reversing the direction of rotation of said motor means and thereby providing reciprocable movement of said dielectric member in one portion of said wave guide, said relative control circuit being operable to reverse the direction of rotation of said motor means and cause movement of said dielectric member to another portion of said wave guide, with said dielectric member being continuously moved within said wave guide so long as said absolute control circuit causes operation of said motor means.

12. A diversity receiving system including in combination first and second spaced antenna means, means coupled to said first and second antenna means for combining the waves therein, said combining means including an adjustable phase shift member for shifting the phase of the waves received by one of said antenna means, reversible motor means, means connecting said reversible motor means to said member for moving the same in response to rotation of said motor means between two extreme positions which define a range of positions which provide a range of phase shifts, means coupled to said combining means for providing a control voltage varying substantially linearly with the level of the combined waves therein, absolute control means operative when said control voltage falls below a first value, relative control means operative when said control voltage falls below a second value which is lower than said first value, and a control circuit for said reversible motor means including said relative control means, said absolute control means and limit means, said control circuit causing operation of said motor means in response to operation of said absolute control means with the direction of rotation depending on the position of said relative control means, said limit means operating the change the direction of rotation of said motor means when said member approaches said extreme positions, and said control circuit including means causing said motor means to reverse the direction of rotation in response to operation of said relative control means.

References Cited in the file of this patent

UNITED STATES PATENTS

| | | |
|---|---|---|
| 2,041,600 | Friis | May 19, 1936 |
| 2,042,831 | Crosby | June 2, 1936 |
| 2,349,407 | Crosby | May 23, 1944 |
| 2,375,126 | Mathes | May 1, 1945 |
| 2,433,368 | Johnson et al. | Dec. 30, 1947 |
| 2,505,266 | Villem | Apr. 25, 1950 |
| 2,623,993 | Altar | Dec. 30, 1952 |
| 2,640,915 | Sichak | June 2, 1953 |